United States Patent [19]
Alexandrovich et al.

[11] Patent Number: 5,886,472
[45] Date of Patent: Mar. 23, 1999

[54] ELECTRODELESS LAMP HAVING COMPENSATION LOOP FOR SUPPRESSION OF MAGNETIC INTERFERENCE

[75] Inventors: Benjamin Alexandrovich; Valery A. Godyak, both of Brookline; Robert B. Piejak, Wayland, all of Mass.

[73] Assignee: OSRAM Sylvania Inc., Danvers, Mass.

[21] Appl. No.: 893,814

[22] Filed: Jul. 11, 1997

[51] Int. Cl.⁶ ..................................................... H01J 1/52
[52] U.S. Cl. ............................................. 315/85; 315/248
[58] Field of Search .............................. 315/85, 248, 267, 315/344

[56] References Cited

U.S. PATENT DOCUMENTS

| | | |
|---|---|---|
| 3,500,118 | 3/1970 | Anderson . |
| 3,987,334 | 10/1976 | Anderson ................................. 315/57 |
| 4,245,179 | 1/1981 | Buhrer .................................... 315/248 |
| 4,254,363 | 3/1981 | Walsh ..................................... 315/248 |
| 4,409,521 | 10/1983 | Roberts ................................... 315/57 |
| 4,568,859 | 2/1986 | Houkes et al. .......................... 315/248 |
| 4,645,967 | 2/1987 | Bouman et al. ......................... 313/248 |
| 4,704,562 | 11/1987 | Postma et al. .......................... 315/248 |
| 4,727,294 | 2/1988 | Houkes et al. .......................... 315/248 |
| 4,920,297 | 4/1990 | van der Heijden ..................... 313/315 |
| 4,940,923 | 7/1990 | Kroontje et al. ........................ 315/248 |
| 5,239,238 | 8/1993 | Bergervoet et al. .................... 315/248 |
| 5,539,283 | 7/1996 | Piejak et al. ............................ 315/248 |
| 5,694,000 | 12/1997 | Anotonis et al. ....................... 313/234 |

OTHER PUBLICATIONS

Anderson, Illuminating Engineering, Apr. 1969, pp. 236–244.

*Primary Examiner*—Robert Pascal
*Assistant Examiner*—Justin P. Bettendorf
*Attorney, Agent, or Firm*—Carlo S. Bessone

[57] ABSTRACT

An electric lamp assembly includes an electrodeless lamp having an electrodeless lamp envelope enclosing a fill material for supporting a low pressure discharge, a driving inductor including a magnetic core disposed in proximity to the lamp envelope and an input winding disposed on the magnetic core, a compensation loop disposed in proximity to the lamp envelope, a radio frequency power source and a compensation loop network. The compensation loop network has an input coupled to the radio frequency power source and outputs coupled to the input winding and to the compensation loop. The radio frequency power source and the compensation loop network supply radio frequency energy to the electrodeless lamp to produce a discharge in the lamp envelope and supply radio frequency energy to the compensation loop to generate a magnetic field that substantially counteracts a magnetic field produced by the discharge. In one embodiment, the lamp envelope is a closed-loop, tubular lamp envelope, and the magnetic core is disposed around the lamp envelope. In another embodiment, the lamp envelope includes a reentrant cavity, and the magnetic core is disposed in the reentrant cavity.

14 Claims, 3 Drawing Sheets

ELECTRODELESS LAMP HAVING COMPENSATION LOOP FOR SUPPRESSION OF MAGNETIC INTERFERENCE

FIELD OF THE INVENTION

This invention relates to low pressure, electrodeless discharge lamps and, more particularly, to electrodeless discharge lamps having compensation loops for suppression of near-field electromagnetic interference.

BACKGROUND OF THE INVENTION

Electrodeless fluorescent lamps are disclosed in U.S. Pat. No. 3,500,118 issued Mar. 10, 1970 to Anderson; U.S. Pat. No. 3,987,334 issued Oct. 19, 1976 to Anderson; and Anderson, *Illuminating Engineering*, April 1969, pages 236–244. An electrodeless, inductively-coupled lamp, as disclosed in these references, includes a low pressure mercury/buffer gas discharge in a discharge tube which forms a continuous, closed electrical path. The path of the discharge tube goes through the center of one or more toroidal ferrite cores such that the discharge tube becomes the secondary of a transformer. Power is coupled to the discharge by applying a sinusoidal voltage to a few turns of wire wound around the toroidal core that encircles the discharge tube. A current through the primary winding creates a time-varying magnetic flux which induces along the discharge tube a voltage that maintains the discharge. The inner surface of the discharge tube is coated with a phosphor which emits visible light when irradiated by photons emitted by the excited mercury atoms. The lamp parameters described by Anderson produce a lamp which has a high core loss and is therefore extremely inefficient. In addition, the Anderson lamp is impractically heavy because of the ferrite material used in the transformer core.

An electrodeless lamp assembly having high efficiency is disclosed in U.S. application Ser. No. 08/624,043, filed Mar. 27, 1996 now U.S. Pat. No. 5,834,905. The disclosed lamp assembly comprises an electrodeless lamp including a closed-loop, tubular lamp envelope enclosing mercury vapor and a buffer gas at a pressure less than about 0.5 torr, a transformer core disposed around the lamp envelope, an input winding disposed on the transformer core and a radio frequency power source coupled to the input winding. The radio frequency power source typically has a frequency in a range of about 100 kHz to about 400 kHz. The radio frequency source supplies sufficient radio frequency energy to the mercury vapor and the buffer gas to produce in the lamp envelope a discharge having a discharge current equal to or greater than about 2 amperes. The disclosed lamp assembly achieves relatively high lumen output, high efficacy and high axial lumen density simultaneously, thus making it an attractive alternative to conventional VHO fluorescent lamps and high intensity, high pressure discharge lamps.

When a discharge is sustained by high frequency alternating current, magnetic interference can be a serious problem. The problem increases in severity as the magnitude of the current and the dimensions of the discharge increase. In the case of an inductively coupled electrodeless light source, this is a practical problem that must be addressed to satisfy electromagnetic interference (EMI) regulations.

The source of near field magnetic interference in an electrodeless light source is the magnetic field created by the high frequency discharge current. Prior art methods of magnetic field suppression are based on placing a closed conductive ring or loop next to the discharge, such that the discharge current induces a counter current in the loop. In principle, the counter current creates a magnetic field of proper magnitude and phase to counteract the magnetic field of the discharge. This arrangement of a counter current loop positioned near a discharge current loop generally results in loose coupling. However, loose coupling cannot provide good balance between the discharge current and the loop current. Thus, these prior art techniques result in rather limited magnetic field suppression.

U.S. Pat. No. 4,409,521 issued Oct. 11, 1983 to Roberts discloses a circular electroded fluorescent lamp having a cancellation loop external to the lamp envelope, which produces a magnetic field generally in opposition to the magnetic field generated by the current in the arc discharge.

U.S. Pat. No. 5,539,283 issued Jul. 23, 1996 to Piejak et al discloses a discharge light source having reduced magnetic interference. A conductive loop surrounding a driving inductor is terminated in a capacitor to lower the impedance of the compensation circuit, so that the compensation current is increased.

U.S. Pat. Nos. 4,568,859; 4,645,967; 4,704,562; 4,727,294; 4,920,297 and 4,940,923 disclose a set of conductive short circuited rings that surround a lamp envelope. When a discharge is inductively excited, the rings create a current which induces a magnetic flux, in a direction opposite to the primary flux, that neutralizes some of the magnetic flux of the primary induction coil. This technique is not very effective and is found to reduce the magnetic flux emitted from the discharge by only about 2.0 dB per ring.

Additional techniques for suppressing electromagnetic interference in electrodeless discharge lamps are disclosed in U.S. Pat. No. 4,245,179 issued Jan. 13, 1981 to Buhrer; U.S. Pat. No. 4,254,363 issued Mar. 3, 1981 to Walsh; and U.S. Pat. No. 5,239,238 issued Aug. 24, 1993 to Bergervoet et al. The disclosed techniques are understood to lack effectiveness and practicality.

Accordingly, improved techniques for reducing electromagnetic interference generated by electrodeless discharge lamps are required.

SUMMARY OF THE INVENTION

According to the present invention, an electric lamp assembly is provided. The lamp assembly comprises an electrodeless lamp including an electrodeless lamp envelope enclosing a fill material for supporting a low pressure discharge, a driving inductor comprising a magnetic core in proximity to the lamp envelope and an input winding disposed on the magnetic core, a compensation loop disposed in proximity to the lamp envelope, a radio frequency power source and a compensation loop network. The compensation loop network has an input coupled to the radio frequency power source and outputs coupled to the input winding and to the compensation loop. The radio frequency power source and the compensation loop network supply radio frequency energy to the electrodeless lamp to produce the discharge in the lamp envelope, and supply radio frequency energy to the compensation loop to generate a magnetic field that substantially counteracts a magnetic field produced by the discharge.

In a first embodiment, the electrodeless lamp envelope has a closed-loop, tubular configuration, and the magnetic core is disposed around the lamp envelope. Preferably, the compensation loop has a shape and dimension that substantially matches the shape and dimension of the discharge current in the lamp envelope. The compensation loop is preferably positioned in proximity to the discharge current.

The compensation loop network supplies a discharge-supporting current and a magnetizing current to the driving inductor and supplies a loop current to the compensation loop. The loop current generates a magnetic field that substantially counteracts the magnetic field produced by the discharge.

In a first implementation, the compensation loop network comprises a circuit for connecting the input winding and the compensation loop electrically in series.

In a second implementation, the compensation loop network comprises a circuit for connecting the input winding and the compensation loop electrically in series, and further comprises a capacitor connected across the input winding for eliminating a phase shift introduced by the magnetizing current through the input winding at the operating frequency of the radio frequency power source.

In a third implementation, the compensation loop network comprises a compensating inductor and a current transformer. The current transformer includes first and secondary primary windings, and a secondary winding. The first primary winding is connected in series with the input winding to the output of the radio frequency power source. The second primary winding is connected in series with the compensating inductor to the output of the radio frequency power source. The secondary winding is connected to the compensation loop. The compensating inductor compensates for the magnetizing current of the input winding.

In a second embodiment, the lamp envelope includes a reentrant cavity, and the magnetic core is disposed in the reentrant cavity. The compensation loop is positioned adjacent to the lamp envelope so as to generate a magnetic field that counteracts the magnetic field produced by the discharge.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
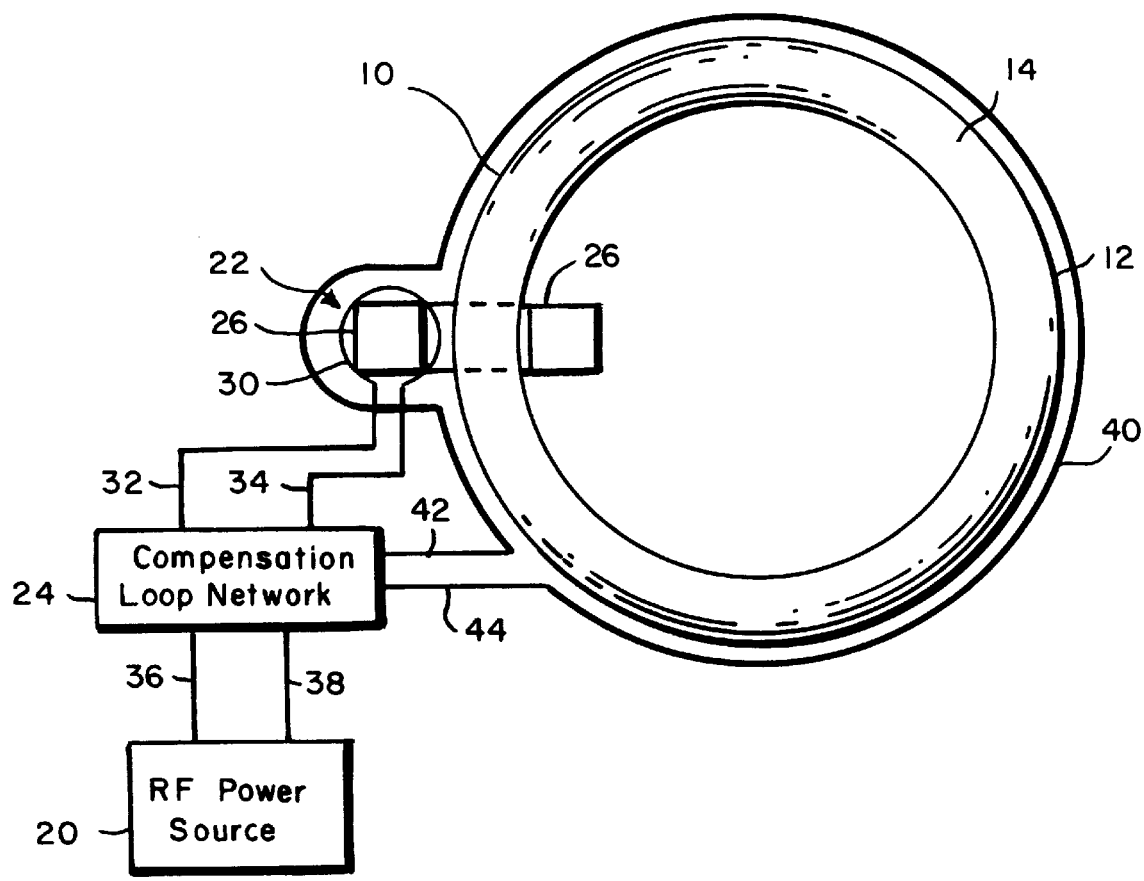
FIG. 1 is a schematic diagram of a first embodiment of an electrodeless lamp assembly in accordance with the invention.

A first embodiment of a discharge lamp assembly in accordance with the present invention is shown in FIG. 1. A lamp assembly comprises an electrodeless lamp 10 including a lamp envelope 12 which has a tubular, closed-loop configuration and is electrodeless. The lamp envelope 12 encloses a discharge region 14 containing a buffer gas and mercury vapor. A phosphor coating may be formed on the inside surface of lamp envelope 12. Radio frequency (RF) energy from an RF power source 20 is inductively coupled to a discharge in discharge region 14 by a driving inductor 22. The driving inductor 22 includes a transformer core 26 and an input winding 30 on transformer core 26. The transformer core 26 preferably has a toroidal configuration that surrounds lamp envelope 12. In other embodiments, two or more driving inductors may be used to couple RF energy from RF power source 20 to the discharge in discharge region 14. The RF power source 20 is coupled through a compensation loop network 24 to input winding 30 on transformer core 26. Input winding 30 is connected by leads 32 and 34 to a first output of compensation loop network 24, and RF power source 20 is connected by leads 36 and 38 to an input of compensation loop network 24.

In operation, RF energy is inductively coupled to a low pressure discharge within lamp envelope 12 by driving inductor 22. The electrodeless lamp 10 acts as a secondary winding for driving inductor 22. The RF current through winding 30 creates a time-varying magnetic flux which induces along the electrodeless lamp 10 a voltage that maintains a discharge. The discharge within electrodeless lamp 10 emits ultraviolet radiation which stimulates emission of visible light by the phosphor coating on the lamp envelope. In this configuration, the lamp envelope 12 is fabricated of a material, such as glass, that transmits visible light. In an alternative configuration, the electrodeless lamp is used as a source of ultraviolet radiation. In this configuration, the phosphor coating is omitted and the lamp envelope 12 is fabricated of an ultraviolet-transmissive material, such as quartz.

The lamp envelope 12 preferably has a cross-sectional diameter in a range of about 1 inch to about 4 inches for high lumen output. The fill material may comprise a buffer gas and a small amount of mercury which produces mercury vapor. The buffer gas is preferably a noble gas and is most preferably krypton. It has been found that krypton provides higher lumens per watt in the operation of the lamp at moderate power loading. At high power loading, use of argon may be preferable. The lamp envelope 12 can have any shape which forms a closed loop, including a circular shape, as shown in FIG. 1, an oval shape, an elliptical shape or a series of straight tubes joined to form a closed loop.

The transformer core 26 is preferably fabricated of a high permeability, low loss, ferrite material, such as manganese zinc ferrite. The transformer core 26 forms a closed loop around lamp envelope 12 and typically has a toroidal configuration, with an inside diameter that is slightly larger than the outside diameter of lamp envelope 12. The winding 30 may comprise a few turns of wire on transformer core 26 of sufficient size to carry the primary current. The driving inductor 22 is configured to step down the primary voltage and to step up the primary current, typically by a factor of 5 to 10. Thus, winding 30 typically has 5 to 10 turns.

The RF power source 20 preferably operates in a frequency range of about 50 kHz to about 3 MHz and most preferably operates in a frequency range of about 100 kHz to about 400 kHz. Additional details regarding the electrodeless discharge lamp assembly are disclosed in U.S. application Ser. No. 08/624,043 filed Mar. 27, 1996 now U.S. Pat. No. 5,834, 905.

A compensation loop 40 is positioned in proximity to electrodeless lamp 10. The compensation loop 40 goes around (not through) transformer core 26 and any other transformer core that may be utilized. Thus, the current in input winding 30 of driving inductor 22 does not couple to compensation loop 40. The compensation loop 40 preferably has a size and shape that approximately matches the size and shape of lamp envelope 12. Most preferably, the compensation loop 40 has a size and shape that approximately matches the size and shape of the path followed by the discharge current within lamp envelope 12. Thus, in the example of FIG. 1, lamp envelope 12 and compensation loop 40 are generally circular and have similar diameters. The compensation loop 40 and the lamp envelope 12 typically have generally planar configurations and are either coplanar or are located in parallel planes. The compensation loop 40 is located as close as is practical to lamp envelope 12 and may be located along the outside circumference of lamp envelope 12, as shown in FIG. 1, may be located along the inside circumference of lamp envelope 12 or may be located above or below lamp envelope 12. The compensation loop is connected by leads 42 and 44 to a second output of compensation loop network 24. The compensation loop 40 is made of a high conductivity material, such as copper or aluminum, in order to introduce minimal loss and may comprise one or more turns of wire. In one example, the compensation loop 40 and the input winding 30 have equal numbers of turns.

The compensation loop 40 is driven through compensation loop network 24 by RF source 20 with a loop current, or counter current, that balances the discharge current in electrodeless lamp 10. Balance is achieved when the compensation loop current times the number of turns in compensation loop 40 is equal or nearly equal in magnitude to the discharge current, and the compensation loop current is opposite or nearly opposite in phase with respect to the discharge current.

Figure 2:
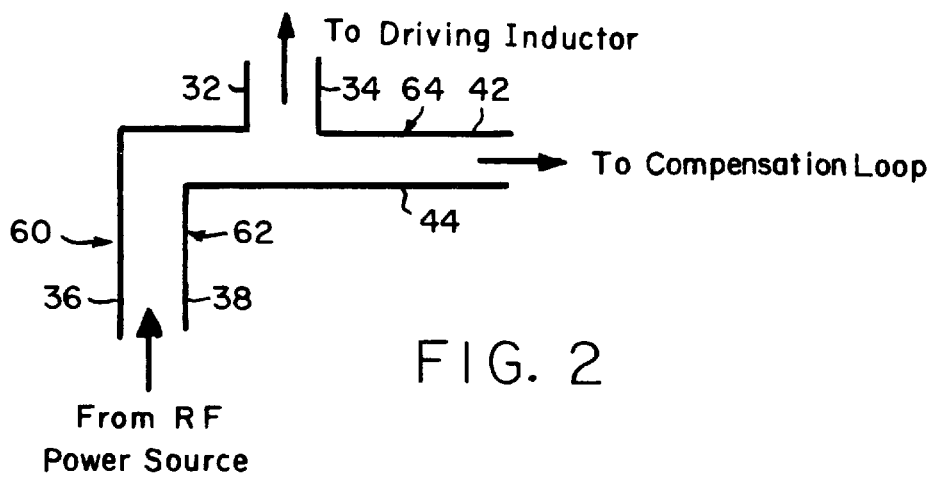
FIG. 2 is a schematic diagram of a first embodiment of the compensation loop network of FIG. 1.

A first implementation of the compensation loop network 24 is shown in FIG. 2. Conductive leads 60 and 62 are connected to RF power source 20; conductive leads 60 and 64 are connected to input winding 30; and conductive leads 62 and 64 are connected to compensation loop 40. In this implementation, the compensation loop 40 is wired in series with input winding 30. If the number of turns in the compensation loop 40 equals the transformation ratio of current in the input winding 30 to discharge current, the magnitude of the magnetic field produced by the discharge equals the magnitude of the magnetic field produced by the compensation loop 40. In the example of FIG. 1, using only one transformation core, the transformation ratio is the number of turns in input winding 30.

The implementation of FIG. 2 results in only a partial reduction of magnetic interference from the discharge current, because the discharge current and the compensation loop current are not in phase. In this implementation, it is impossible to achieve proper relative phase, because the magnetizing current of the driving inductor 22 adds to the transformed current of the discharge, resulting in a phase shift between the discharge current and the compensation loop current. The accuracy of the balance between discharge current and compensation loop current in this implementation depends on the fraction of the total current supplied to the driving inductor 22 that is magnetizing current. Laboratory measurements of this technique show a 10 to 20 dB suppression of magnetic field at the fundamental frequency in a frequency range of 0.1 to 1 MHz. Harmonics are normally suppressed more than the fundamental frequency. Absolute numbers depend on the reactance and loss factor of the driving inductor, i.e. on the size of the transformer core 26 and the core material.

Figure 3:
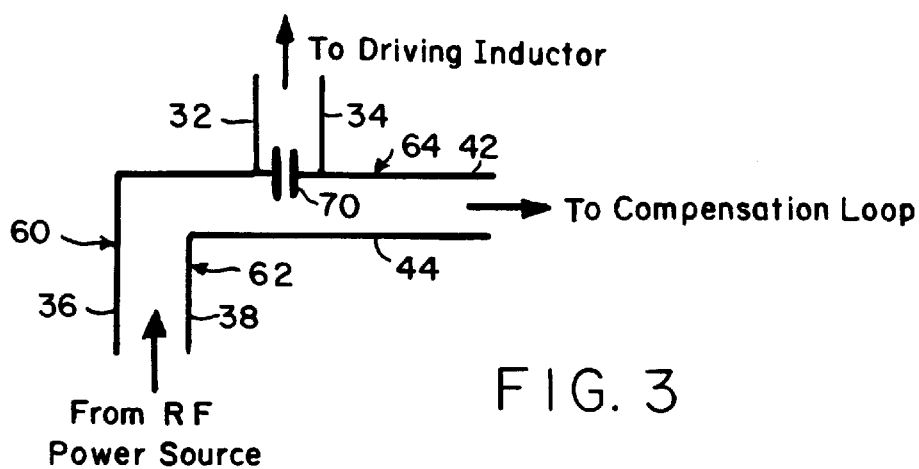
FIG. 3 is a schematic diagram of a second embodiment of the compensation loop network of FIG. 1.

A second implementation of the compensation loop network, which achieves both magnitude and phase balance between the discharge current and the compensation loop current at the fundamental frequency of operation, is shown in FIG. 3. Conductive leads 60, 62 and 64 connect the input winding 30 and the compensation loop 40 in series. A capacitor 70 is connected between leads 60 and 64 in parallel with input winding 30. At the resonant frequency of capacitor 70 and driving inductor 22, the capacitor 70 eliminates the phase shift introduced by current flow through the magnetizing inductance. When the number of turns on the compensation loop 40 is equal to the current transformation ratio from the supply circuit into the discharge, and the RF power source 20 is operating at the resonant frequency of capacitor 70 and the magnetizing inductance of driving inductor 22, suppression of magnetic field due to discharge current was observed to exceed 40 dB. The network of FIG. 3 is ineffective in suppression of harmonic frequencies, and the accuracy of the balance of currents in this embodiment is sensitive to component tolerance and temperature change.

Figure 4:
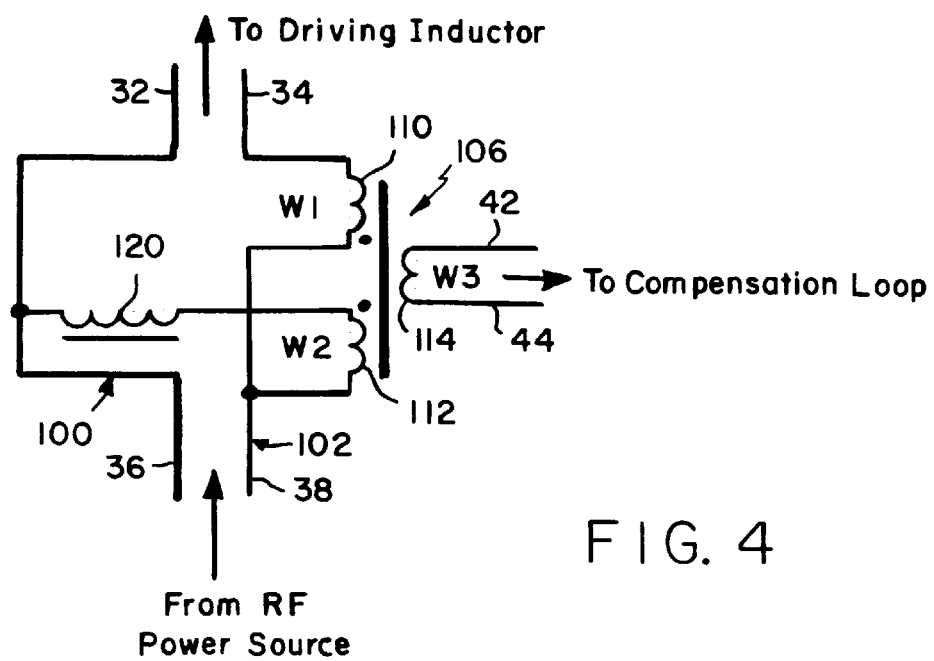
FIG. 4 is a schematic diagram of a third embodiment of the compensation loop network of FIG. 1.

A third implementation of the compensation loop network, which provides very accurate balance both in phase and magnitude between the discharge current and the compensation loop current, is shown in FIG. 4. In the network of FIG. 4, magnetic field suppression occurs not only at the fundamental frequency but at the harmonic frequencies as well. A current transformer 106 includes primary windings 110 and 112, and a secondary winding 114. An electrical lead 100 is connected to one side of input winding 30. An electrical lead 102 is connected to a positive side of primary winding 110 and to a negative side of primary winding 112. A negative side of primary winding 110 is connected to the other side of input winding 30. A compensating inductor 120 is connected between lead 100 and a positive side of primary winding 112. The secondary winding 114 of current transformer 106 is connected to compensation loop 40. Thus, the compensation loop current is supplied through current transformer 106. The number of turns in the windings 110,112 and 114 of current transformer 106 are selected to provide a balance in the magnitude of the discharge current and the compensation loop current, while the current through inductor 120 compensates for the magnetizing current of the driving inductor 22 and thus establishes the proper phase between the discharge current and the compensation loop current.

In the implementation of FIG. 4, it is possible to compensate for temperature variation of inductance and loss factor of the driving inductor 22. In order to achieve this, inductor 120 should be of the same ferromagnetic material as transformer core 26 and should be designed to have about the same flux density. In addition, the inductor 120 and transformer core 26 should be in thermal contact to provide best matching of their characteristics. Inductor 120 can be designed so that it is much smaller than the driving inductor 22 and thus can be rather inexpensive.

Figure 5:
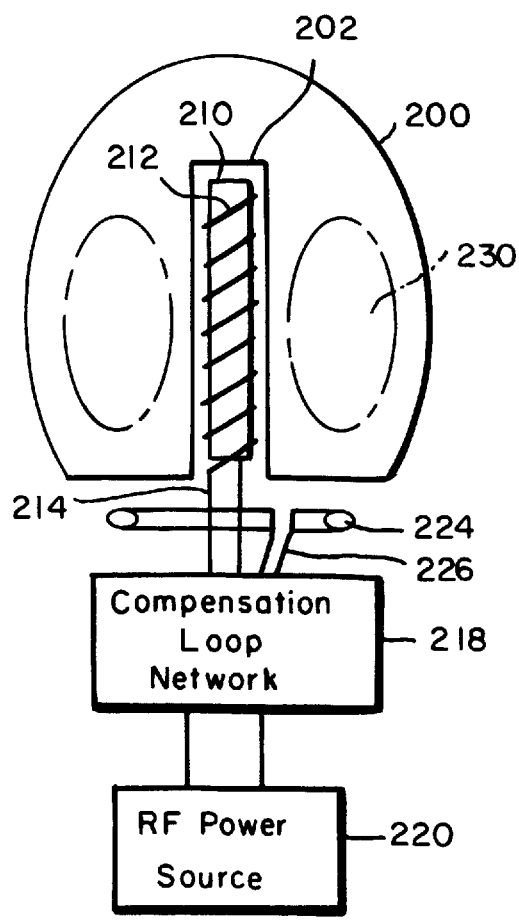
FIG. 5 is a schematic diagram of a second embodiment of an electrodeless lamp assembly in accordance with the invention.

A second embodiment of an electrodeless lamp assembly in accordance with the present invention is shown in FIG. 5. An electrodeless lamp includes a lamp envelope 200 having a generally bulbous shape and including a reentrant cavity 202. Lamp envelope 200 contains a fill material, such as mercury vapor and a buffer gas, for supporting a low pressure discharge. A ferrite core 210 is positioned in reentrant cavity 202. An input winding 212 is wound on ferrite core 210. Input winding 212 is connected by leads 214 to a first output of a compensation loop network 218. An RF power source 220 supplies RF energy to an input of compensation loop network 218. A compensation loop 224 is connected by leads 226 to a second output of compensation loop network 218.

The electrodeless lamp of FIG. 5 is driven by an open magnetic path. In operation, RF energy is inductively coupled to a low pressure discharge 230 within lamp envelope 200 by core 210 and input winding 212. The discharge current associated with discharge 230 produces a time-varying magnetic field that may cause magnetic interference. The compensation loop 224 is supplied with a current having a proper phase and magnitude to counteract the total magnetic field produced by the driving inductor and the discharge. The compensation loop networks shown in FIGS. 2–4 and described above may be utilized in the lamp assembly of FIG. 5. The compensation loop network of FIG. 4 is preferred.

It will be understood that different compensation loop networks may be utilized within the scope of the present invention. In general, the compensation loop network is driven by the RF power source that supplies RF power to the electrodeless lamp. The compensation loop network is configured to supply discharge current and compensation loop current of balanced magnitudes and opposite phases, such that the magnetic fields produced by the discharge current and the compensation loop current counteract each other and thereby reduce or eliminate magnetic interference.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An electric lamp assembly comprising:
   an electrodeless lamp comprising an electrodeless, closed-loop, tubular lamp envelope enclosing mercury vapor and a buffer gas;
   a driving inductor comprising a transformer core disposed around said lamp envelope and an input winding disposed on said transformer core;
   a compensation loop disposed in proximity to said lamp envelope;
   a radio frequency power source; and
   a compensation loop network having an input coupled to said radio frequency power source and outputs coupled to said input winding and to said compensation loop, said radio frequency power source and said compensation loop network supplying radio frequency energy to said electrodeless lamp to produce a discharge in said lamp envelope, and supplying radio frequency energy to said compensation loop to generate a magnetic field that substantially counteracts a magnetic field produced by said discharge, said compensation loop network comprises a circuit for supplying a discharge-supporting current and a magnetizing current to said driving inductor and for supplying a loop current to said compensation loop to generate the magnetic field that substantially counteracts the magnetic field produced by said discharge said compensation loop network includes means for compensating for said magnetizing current.

2. The electric lamp assembly as defined in claim 1 wherein said compensation loop has a shape and dimension that substantially matches a shape and dimension of said lamp envelope.

3. The electric lamp assembly as defined in claim 1 wherein said discharge produces a discharge current and wherein said compensation loop is positioned in proximity to said discharge current.

4. The electric lamp assembly as defined in claim 1 wherein said compensation loop has a shape and dimension that substantially matches a shape and dimension of said discharge current.

5. The electric lamp assembly as defined in claim 1 wherein said lamp envelope and said compensation loop are disposed in parallel planes.

6. The electric lamp assembly as defined in claim 1 wherein said compensation loop network comprises a circuit for connecting said input winding and said compensation loop electrically in series.

7. An electric lamp assembly comprising:
   an electrodeless lamp comprising an electrodeless, closed-loop, tubular lamp envelope enclosing mercury vapor and a buffer gas;
   a driving inductor comprising a transformer core disposed around said lamp envelope and an input winding disposed on said transformer core;
   a compensation loop disposed in proximity to said lamp envelope;
   a radio frequency power source; and
   a compensation loop network having an input coupled to said radio frequency power source and outputs coupled to said input winding and to said compensation loop, said radio frequency power source and said compensation loop network supplying radio frequency energy to said electrodeless lamp to produce a discharge in said lamp envelope, and supplying radio frequency energy to said compensation loop to generate a magnetic field that substantially counteracts a magnetic field produced by said discharge, said compensation loop network comprises a circuit for connecting said input winding and said compensation loop electrically in series, said circuit further comprising a capacitor connected across said input winding for eliminating a phase shift introduced by a magnetizing current through said input winding at an operating frequency of said radio frequency power source.

8. The electric lamp assembly as defined in claim 7 wherein said compensation loop network comprises a compensating inductor and a current transformer, said current transformer including first and second primary windings and a secondary winding, said first primary winding connected in series with said input winding to the output of said radio frequency power source, said second primary winding connected in series with said compensating inductor to the output of said radio frequency power source, and said secondary winding connected to said compensation loop, wherein said compensating inductor compensates for the magnetizing current of said input winding.

9. An electric lamp assembly comprising:
   an electrodeless lamp comprising an electrodeless lamp envelope enclosing a fill material for supporting a low pressure discharge;
   a driving inductor comprising a magnetic core disposed in proximity to said lamp envelope and an input winding disposed on said magnetic core;
   a compensation loop disposed in proximity to said lamp envelope;
   a radio frequency power source; and
   a compensation loop network having an input coupled to said radio frequency power source and outputs coupled to said input winding and to said compensation loop, said radio frequency power source and said compensation loop network supplying radio frequency energy to said electrodeless lamp to produce said discharge in said lamp envelope, and supplying radio frequency energy to said compensation loop to generate a magnetic field that substantially counteracts a magnetic field produced by said discharge, said compensation loop network comprises a circuit for connecting said input winding and said compensation loop electrically in series, said circuit further comprising a capacitor connected across said input winding for eliminating a phase shift introduced by a magnetizing current through said input winding at an operating frequency of said radio frequency power source.

10. The electric lamp assembly as defined in claim 9 wherein said compensation loop network comprises a compensating inductor and a current transformer, said current transformer including first and second primary windings and a secondary winding, said first primary winding connected in series with said input winding to the output of said radio frequency power source, said second primary winding connected in series with said compensating inductor to the output of said radio frequency power source, and said secondary winding connected to said compensation loop, wherein said compensating inductor compensates for the magnetizing current of said input winding.

11. An electric lamp assembly comprising:
   an electrodeless lamp comprising an electrodeless lamp envelope enclosing a fill material for supporting a low pressure discharge;
   a driving inductor comprising a magnetic core disposed in proximity to said lamp envelope and an input winding disposed on said magnetic core;
   a compensation loop disposed in proximity to said lamp envelope;
   a radio frequency power source; and
   a compensation loop network having an input coupled to said radio frequency power source and outputs coupled to said input winding and to said compensation loop, said radio frequency power source and said compensation loop network supplying radio frequency energy to said electrodeless lamp to produce said discharge in said lamp envelope, and supplying radio frequency energy to said compensation loop to generate a magnetic field that substantially counteracts a magnetic field produced by said discharge, said compensation loop network comprises a circuit for supplying a discharge-supporting current and a magnetizing current to said driving inductor and for supplying a loop current to said compensation loop to generate the magnetic field that substantially counteracts the magnetic field produced by said discharge, said compensation loop network includes means for compensating for said magnetizing current.

12. The electric lamp assembly as defined in claim 11 wherein said lamp envelope includes a reentrant cavity and wherein said magnetic core is disposed in said reentrant cavity.

13. The electric lamp assembly as defined in claim 11 wherein said lamp envelope comprises a closed-loop, tubular lamp envelope and wherein said magnetic core is disposed around said lamp envelope.

14. The electric lamp assembly as defined in claim 11 wherein said compensation loop network comprises a circuit for connecting said input winding and said compensation loop electrically in series.

\* \* \* \* \*